United States Patent Office
2,859,105
Patented Nov. 4, 1958

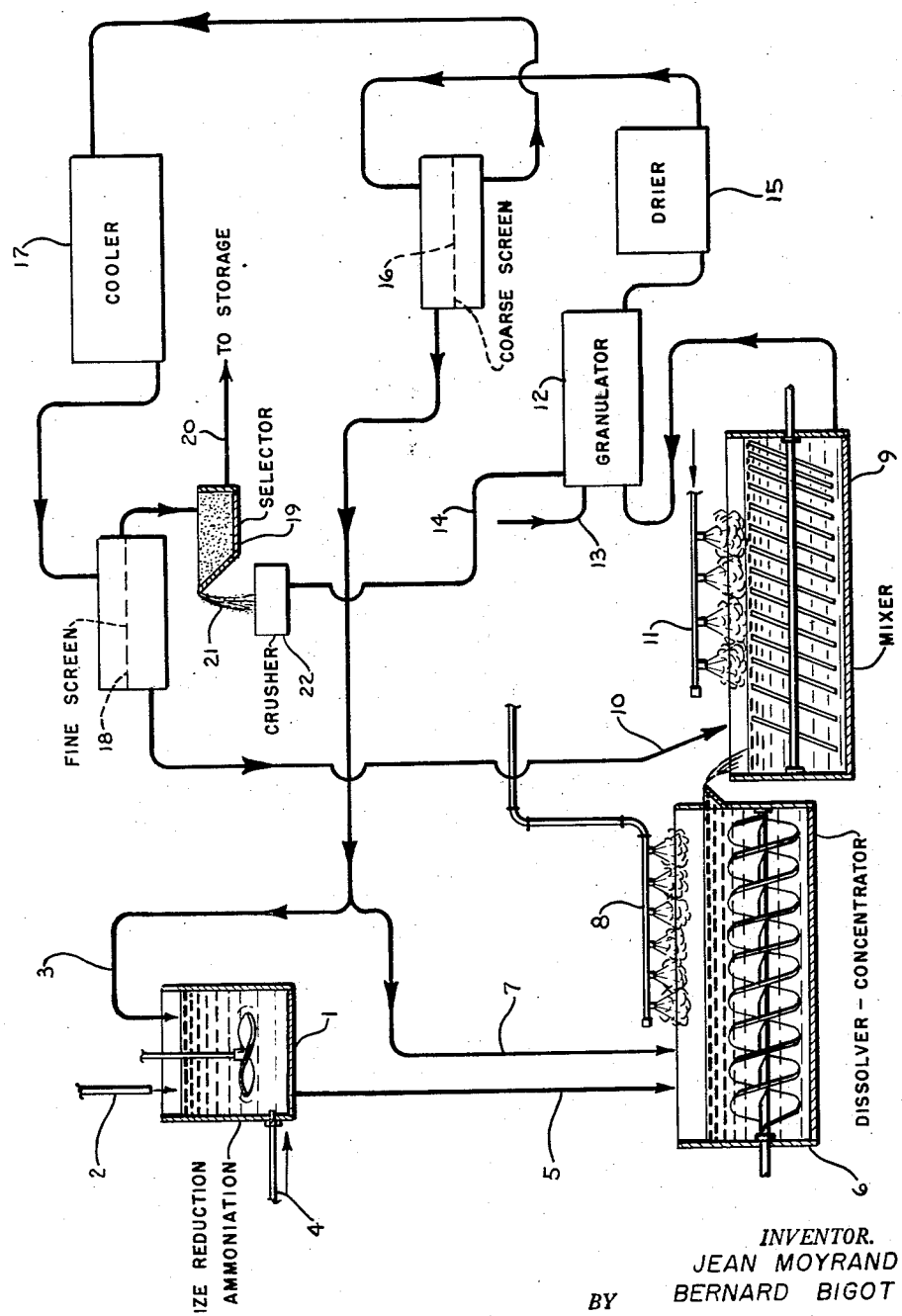

2,859,105

GRANULAR FERTILIZERS AND PROCESSES FOR MAKING THEM

Jean Moyrand, Chauny, and Bernard Bigot, Rouen, France, assignors to Societe Anonyme des Manufactures des Glaces et Produits Chimiques de Saint-Gobain, Chauny & Cirey, Paris, France Application July 9, 1952, Serial No. 297,872

Claims priority, application France July 24, 1951

12 Claims. (Cl. 71—64)

This invention relates to fertilizers, primarily, but the principles thereof are applicable to the granulation of various salts from solutions or, particularly, from sludges which are rich in water, that is to say, which are capable because of their content of liquid of dissolving some of the final product of the process. As the invention solves a number of problems in the difficult process of preparing granular fertilizers it will be described in connection with that manufacture.

The first step in the standard process of producing fertilizer is to attack natural phosphate of fertilizer grade with an acid. Examples of such phosphates are the natural phosphates of Morocco and Florida. Phosphates of fertilizer grade also include some by-products of certain industries, such as phosphatic slags from the iron and steel industries, but most of it is of natural origin. The acids usually employed to open the phosphate are sulfuric acid and nitric acid, which are used alone or in combination. The employment of nitric acid either alone or in combination makes a process which is of particular difficulty, beset by losses of valuable ingredients, and plagued with great difficulties of granulation. As this is the most difficult of the fertilizer processes, the invention will be described in relation to it, but without restricting the generality of its application.

During the process of manufacturing fertilizer by the methods of the prior art, the natural phosphate, which is most generally used, is attacked by acid, producing a sludge which is subjected directly to granulation, but before that can be accomplished, it is necessary to incorporate with the sludge a large amount of dry material, and that dry material is generally obtained from the final product of the process itself, that is, completed fertilizer is added to the sludge. Thus, a large part of the finished product has to pass at least twice through the apparatus and steps of the process and, for the purposes of this specification, the finished product thus returned is called the re-cycled product.

For reasons which are well-known in the industry, it is desirable to sell a granulated product of which the granules are of like size, consequently the product is screened at the end of the process and the oversized particles, those which are larger than the size which it is desired to market, and the undersized particles, those which are smaller, are re-cycled. The large particles are crushed or otherwise broken and reduced in size before they are admitted to the process again. These operations require handling and a contribution of additional energy, which is the greater as the re-cycled product attains five to six times the weight of the product which is produced by the factory in marketable condition. The processes of the prior art may, consequently, be accused, with some justice, of gross inefficiency which acts strongly to elevate the price of the product.

Another difficulty is that during the reduction in size of the oversized particles, which are generally insufficiently dried, the apparatus is frequently halted by the clogging of screens and breakers. Furthermore, the prior art processes were generally unstable or unbalanced; for instance, occasionally the relative quantity of fines or of oversized particles increased so that the quantity of re-cycled product increased while the quantity of new material supplied by the acidification of the rock did not increase, and the reintroduction of these exceptionally large quantities upset the granulation so that there was a greater and greater unbalance. This unbalance would increase until it stopped all granulation unless the condition was immediately recognized and corrected by the addition of water to the sludge. It was extremely difficult to make such additions of water with any accuracy.

In order to overcome these difficulties, the prior art has proposed to reduce the quantity of re-cycled product by concentrating the sludges to a maximum before introducing them into the granulator, but it has been the experience of all fertilizer manufacturers that those concentration operations are difficult to carry out, and that it is not possible to attain the necessary concentrations with some fertilizers.

It is an object of this invention to eliminate the preliminary concentration which was an essential characteristic of the improved processes of the prior art. Another object of the invention is to reduce the quantity of product which is re-cycled. Another object is to improve the regularity and controllability of the process and to improve the thermal efficiency of the process and the productive capacity of the apparatus.

The invention involves a new process, and a new apparatus conceived for the carrying out of the process.

According to our invention, our novel process begins with the sludge which is produced by the acidification of phosphate of fertilizer grade. This sludge should be fluid, containing enough water to be capable of dissolving some of the fertilizer produced by the process. In the example hereinafter given, the sludge contained 28% water. The 28% of water found in the accompanying example is not a limitation; the basic requirement for the sludge is that it shall contain enough water to dissolve some of the final product. The sludges that are produced by the normal acidification processes of the prior art, generally contain such a quantity of water. Of course, to obtain the optimum result, it is advisable to produce a sludge having a uniform quantity of water, as this makes for a process of superior efficiency. What constitutes an optimum quantity of water will vary according to the type of fertilizer which is being made, to the acids which are employed, their nature and their strength, and to what materials may be added to the sludge, for instance, phosphoric acid, prior to its employment in granulation. Consequently, for general purposes of this invention it may be stated that the invention proceeds well if one begins by employing a sludge produced by a process of the prior art, i. e. containing from 15 to 35% of water.

Another step of the new process requires the division of the product issuing from the process into three sizes, an average size, otherwise called commercial size, which in the example consists of granules from 2 to 4 millimeters in diameter, fines or undersized particles which are smaller than 2 millimeters in diameter and gross or oversized granules which are larger than 4 millimeters in diameter. In the preferred form of the invention, the fines themselves are divided into two sizes, larger and smaller.

The coarse or oversized particles, from the separation above referred to, are returned to the process by re-cycling, being mixed with the sludge at a stage where it contains enough water to reduce the size of the coarse particles by dissolving their outer parts, or even to dissolve them completely. When only the outer parts are dissolved there is an immediate advantage that the particle size of the oversized re-cycled granules may be reduced to the average dimensions which are desired for sale. Some of the granules may be totally dissolved, but this does no harm as the particles again appear as granules in a later stage of the process. Thus, in this stage of the process, the oversized particles are reduced to the desired size without crushing and without the employment of power for crushing. In this portion of the process the solution is endothermic, requiring an addition of heat to secure the dissolution of some of the re-cycled fertilizer, therefore, in order that the efficiency of the process may be maintained at a maximum, the mixing of the re-cycled product with the sludge should be at a place where the sludge is at the highest temperature possible, i. e. slightly below the boiling point and practically between 80 and 100° C. Advantageously the recycling should take place where exothermic reactions are proceeding and the re-cycled product should be returned while it is as hot as possible, for instance, as soon as it issues from the granulator or the dryer. A particularly valuable phase of the invention arises when the fertilizer is to be ammoniated, as the ammoniation is accompanied by the liberation of heat; so that if the ammoniation and the re-cycling occur at the same place, in the same vat, a valuable and economic heat exchange occurs which improves the efficiency of the process. If, in a particular case, additional heat is needed it can be added by any suitable means to keep the process at peak efficiency.

The addition of the oversized particles to the process by re-cycling can be accomplished advantageously in two stages as will be more particularly pointed out in the following example. This is advantageous but not necessary.

In what we will call the fourth step of the process for purposes of nomenclature, the undersized particles, called fines, from the screening of the finished product, are returned to a later stage, or to later stages, of the process, than those which have been referred to as receiving the re-cycled oversized granules. In this case, it is preferred that the fines be introduced in stages, the finest fines being introduced last. This step can also be accompanied by the introduction of other solids which may enter into the composition of the fertilizer, for instance, the introduction of potassium salts, or the product of average size may be crushed and added if an advantage is gained thereby. Whereas the introduction of the oversized particles as above described may desirably be accompanied by heating, the addition of the fines to the later stages of the process may desirably be accompanied by cooling. The re-cycling of the finest fines and of the crushed granules of medium size, if such are employed, desirably takes place at a temperature from about 50 to 75° C.

The product issuing from the granulation stage proceeds to a dryer and the dried product is sent to a screen from whence the large particles are re-cycled as above described, those which pass through the screen are preferably cooled, and thence sent to another screen which separates the fines from the particles of the size desired for commerce.

The new process overcomes the imperfections of the prior art which have been mentioned hereinabove and in particular reduces the quantity of re-cycled product without having to undertake a preliminary concentration of the sludge. It also reduces the irregularities in quality and quantity which were characteristic of the prior art. Furthermore, the thermal efficiency of the process and the productive capacity of the apparatus are much improved.

In principle, the invention involves dividing the re-cycled product in several fractions which are added to the sludge in different states or stages of the manufacture, these states or stages being selected according to the granular condition of the fractions, that is to say, the size thereof. In practice, the product which issues from the granulator or from the dryer is separated into oversized granules, granules of the size which are desired for the market, and under-sized granules. The oversized granules are re-cycled to a stage of the process where the sludge is still sufficiently fluid to dissolve it, at least in part, thus reducing the dimensions to those which are desired for sale; the fines are re-cycled to the sludge at a later stage of manufacture where the sludge is sufficiently concentrated to crystallize on the fines and to increase their dimensions to the size desired in the final product.

As the dissolving of the oversized granules in the sludge includes a lowering of the temperature which tends to oppose the efficiency of the solution, measures are taken to compensate for this lowering of the temperature; thus, one may re-cycle the over-sized granules to a stage of the process in which the sludge is undergoing exothermic chemical reaction. In addition, the over-sized granules may be re-cycled while as hot as possible, that is, just as they issue from the granulator or the dryer. Finally, if these means are insufficient exterior heating can be resorted to, for instance, blowing the reaction mass with hot air.

On the other hand, the reintroduction of the fines is made under such condition that they produce a crystallization of the sludge, which is exothermic, and consequently this stage of the process is preferably accompanied by any suitable means of refrigeration; a particularly satisfactory method is to refrigerate the fines before they are re-cycled, as this requires refrigeration only of the material of the fines and not of the entire mass in the sludge; however, the sludge may be cooled by blowing with cold air, or by any other appropriate external cooling means desired.

In accordance with a preferred form of the invention, the fines are not re-cycled to a single point or stage of the process but are preferably divided in a plurality of fractions, for instance two, the larger of the fines being introduced first at one point or stage of the process, and the finer at a later stage. In addition, the mass resulting from the addition of fines to the sludge may receive other solid materials which will enter beneficially into the composition of the fertilizer, such as, for example, supplemental fertilizers a fraction of the saleable product after preliminary crushing or other size reduction.

This latter step can be employed, as illustrated in the following example, to assure the regularity of the process.

The apparatus of novel conception which is employed in the operation of this process is shown in the accompanying drawing, and is characterised in that the usual mixer-granulator heretofore employed for the granulation is replaced by three distinct apparatus. The first of these three distinct apparatus is called, for convenience, a dissolver-concentrator, in which the recycled oversized granules are dissolved by the sludge at the same time that they assist in concentrating the sludge. This apparatus advantageously is of large size and is provided with agitators and preferably with a hot-air heating system for maintaining the temperature at about 80 to 100° C. It is supplied with sludge rich in water as above defined and with oversized particles from the final screening. It is satisfactory to discharge the product from this vat by over-flow. When the preparation of the sludge includes a chemical reaction which releases heat, the re-cycling of the oversized granules may be carried out in this vat alone or in part. If it is carried out in part, the portion of the granules not admitted to this dissolver-concentrator is added to the vat in which the ammoniation reaction is proceeding; in this way the exothermic reactions are made available to compensate for the tendency of the process of solution to reduce the temperature of the sludge.

A mixer is connected to the discharge overflow port of the dissolver-concentrator so that the product discharged at the end of one is received at the head of the other. The sludge, concentrated and thickened by the partially dissolved re-cycled product, receives an admixture of fines as it enters the mixer. Within the mixer there is a crystallization of the sludge on the fines which increases the dimension of the fines, bringing them to marketable size. The temperature of the mixer and of the process going on therein should be kept in the range from 50 to 75° C. i. e. below that which is maintained in the dissolver concentrator. A satisfactory method of doing this is to cool the fines before they are introduced to the mixer. If this does not suffice, a blast of cold air can be directed upon the mixture in the mixer. From the end of the mixture the product is directed to a granulator where the temperature should be preferably maintained in the range from about 40 to 65° C. The granulators of the prior art, particularly those having vigorous action, are satisfactory at this stage of the process.

In the case discussed hereinabove, where the fines are introduced in two distinct fractions, the premier is preferably introduced into the mixer, and the thickened paste issuing from the mixer into the granulator receives the second fraction, the smallest fines in the re-cycled product. Granulation of the mass is immediately completed upon contact with such fines.

The product issuing from the granulator is dried in a rotary dryer in which the temperature should be in the range from 70 to 90° C. and then separated into the three portions hereinabove described.

The cooling can be effectuated on the whole mass issuing from the dryer but it is better to carry out a first division of the product into sizes before cooling. It is advantageous to recycle the oversized particles as hot as possible to the concentrator-dissolver. It is also advantageous to submit the product issuing from the dryer to a first separation on a screen of large mesh. Under these conditions, the screening, even though it is effected upon a hot product, is very easy to accomplish. The product which passes through this first screen, that is to say, the fines and the commercial sized particles, is then cooled up to about 20–50° C. in order to be easily separated in a second screen into average particles and fines. The fines may be directed to still a third screen, if it is desired, in order to separate them into larger and smaller fines for separate re-cycling. The medium sized granules are those which are of commercial size and these are moved into storage, while the fines are divided in accordance with their size, between the mixer and the granulator.

It is advantageous to maintain a constant output and to maintain a constant quantity of material in the re-cycling. According to another characteristic of the invention, this is obtained by maintaining the output to storage at a constant delivery rate, returning the whole balance of the output to the process by recycling. In order to accomplish this in the best way the excess of correctly sized product above that which is sent to the storage is finely crushed before being reintroduced into the granulator.

It is an advantage of this process that there is no difficulty in finely dividing this over-plus of material of correct size. It is already evenly sized and it is cold, and the difficulties which arise in connection with the prior art disintegration of the oversized particles has been discovered not to exist. Furthermore, this crushing or grinding only involves a relatively small portion of the product, if any, and involves none at all when the process is perfectly regulated.

In the following example there is a description of the invention as applied to the manufacture of a fertilizer containing about 12% nitrogen, 12% $P_2O_5$, and 20% $K_2O$. The process starts from a phospho nitrate sludge having an ammonium nitrate and dicalcium phosphate base. This sludge is prepared by attacking natural phosphate with nitric acid, reducing the ratio of calcium nitrate either by separation of a part or all of the salt or by adding phosphoric acid, and ammoniating the product. The example is not a limitation but an illustration of the invention, and it is to be noted that the use of phosphoric acid to reduce the ratio of the calcium nitrate is simply exemplary, as other acids, for instance sulphuric acid, can be used for the same purpose.

The invention is also capable of being applied to the fabrication of binary fertilizers, for example, those containing 20% of nitrogen and 20% $P_2O_5$ without potassium. The process may be used, also, for making any kind of fertilizer, even simple, single constituent fertilizer. The optimum concentrations of water in the sludge at the beginning, and the optimum temperatures will differ somewhat with different fertilizers and will be determined in the plant while remaining within the general principles herein set forth, which are applicable to all fertilizers which are produced by a process involving granulation.

The accompanying drawing is a schematic diagram and flow sheet of a novel apparatus employed to carry out the process set forth in the following example. Both apparatus and process will be described in the example.

*Example.*—Nitric acid was used to attack natural phosphate from Morocco at a rate which produced a phospho-nitrate sludge at a rate of eight metric tons per hour. This sludge was ammoniated after it had been stripped of calcium nitrate; removal was accomplished by filtering off a part of the salt and adding phosphoric acid to change the form of the remainder. The sludge required about one percent of its weight of ammoniacal nitrogen to be brought to its final condition for use in the present invention. The sludge obtained titrated 15% $P_2O_5$, 6.5% nitric acid, 5.5% ammoniacal nitrogen, and 28% water. Its temperature was on the order of 105 degrees C. This sludge was poured into a vat 1, provided with an agitator, shown, but not numbered, through a conduit 2, the rate of addition to the vat being, as stated, about 8 metric tons per hour; at the same time, 5 tons per hour of oversized product were discharged from the end of the process and added to the vat through a conduit 3. This recycled product was still hot from the dryer. Through a submerged inlet 4, 100 kilograms per hour of gaseous ammonia were admitted to the vat. The ammoniation was exothermic and contributed to compensate for the chilling effect of the dissolving oversized granules. Thus, the temperature remained constant while the dimensions of the oversized particles were reduced by the dissolving of the outer parts of the granules. In the present case, it was desired to produce granules having a maximum dimension of 4 millimeters and this was accomplished with the rates of addition specified. The material was not totally dissolved. It was also desired that the particle size should not be less than 2 millimeters and the process of size reduction generally stopped above that limit.

It is to be understood that the size could have been selected as desired. The temperature remained substantially constant without the addition of heat, other than that produced by the ammoniation reaction and the temperature of the material from the drier.

The sludge thus formed was discharged, again at about 8 tons per hour, to one end of a long tank 6 provided with a worm-type conveyor, shown but not numbered, which performed a double function of securing good mixing of the ingredients and of constantly moving the mass toward the discharge end. The concentrator-dissolver 6 had a capacity of about 1.5 cubic meters and it received in addition to the discharge from vat 1 about 5 tons per hour of the oversized, re-cycled granules, while still hot, from the dryer. In this apparatus the temperature was maintained constant at about 90°, a blast of hot air being admitted to the top of the mass through a pipe 8; the air was at about 250° C.

The sludge issuing from the concentrator-dissolver by overflow was admitted to a mixer 9 where it was mixed with about 10 tons per hour of fines of dimensions less than 2 millimeters arriving by a conduit 10.

The fines were introduced, re-cycled, at a temperature of about 30° C. and no other cooling was necessary to assure the crystallization of the sludge in the mixer. If, on the contrary, the fines were introduced hot from the dryer, it was advisable to chill the product in the mixer by a blast of cold air issuing from discharge nozzles 11 in order to keep the temperature below 70° C. in the mixer. The paste thus formed in this way was then introduced into a granulator 12 which was of high speed type. There was also admitted to this granulator through the conduit 13 about four tons per hour of potassium chloride titrating about 52% $K_2O$, thus making the finished product a ternary fertilizer. A surplus of finely divided finished product, being the quantity of finished product above a selected, uniform discharge rate for the apparatus, was admitted to this granulator through pipe 14 after preliminary crushing in crusher 22 to the size of fines. In this way, the output of commercial product was maintained constant in spite of accidental variations and changes in production rate.

From the granulator 12, the product went to a dryer 15 and from the dryer to a coarse screen 16 for the purpose of separation into sizes. The screen retained particles larger than 4 millimeters in size, and passed those of smaller dimensions to cooler 17, from which they went to a second screen 18, which passed particles smaller than 2 millimeters and retained those above that size. One-third of the total product issuing from the granulator and dryer was composed of oversized granules (in this case, larger than 4 millimeters) one-third was between 2 and 4 millimeters, that is, of average or commercial size, and one-third was composed of fines (in this case, smaller than 2 millimeters). The oversized particles from screen 16 were re-cycled through conduits 3 and 7 as hereinbefore described. The fines which passed screen 18 were sent to the head end of the mixer 9. The medium sized particles from screen 18 were sent to a uniform-discharge device 19, which directed finished product to storage at a uniform rate. The surplus from this rate of discharge to storage was sent to a crusher 22 where it was reduced to a state of fines and these were added through conduit 14 to the granulator 12.

As above stated, the fines from screen 18 can be divided between the mixer 9 and the granulator 12 and the total product of medium size may be sent to storage, but a superior operation of the apparatus and processes is obtained by discharging to storage less than the total output of the apparatus, the surplus being reduced in size and re-cycled as hereinbefore described.

In the present example, ten tons per hour of oversized granules were obtained, which were re-cycled while still hot, 50% going into the vat 1 and 50% into the concentrator-dissolver 6. There went through the screen 16, composed of mediums and fines, 20 tons per hour which were cooled to 30 degrees C. in the cooler 17 and then separated on the screen 18. This produced 10 tons per hour of granules between 2 and 4 millimeters in size, and ten tons of fines less than 2 millimeters in size which were returned to the mixer 9. The discharge apparatus 19 was regulated to discharge automatically ten tons per hour to storage, any excess above this falling by overflow into a crusher 22 of hammermill type.

The product issuing from the hammermill was very fine and was reintroduced into the granulator 12 down stream of the point of introduction of potassium chloride. The hammermill had a capacity of three tons per hour, which was sufficient, and corresponded to about 30% with respect to the normal rate of production of the apparatus. This represents a material reduction in the size of the crushing apparatus which was required by the prior art in similar processes and which had of necessity of minimum output of ten tons per hour of finely divided material. This represents a material saving in capital investment.

The process and apparatus described in this example produced ten tons per hour of granulated product with a reduction of re-cycled product of about 20 tons per hour, that is to say, that the prior art process starting with like raw materials required the re-cycling of 20 tons per hour more of finished product than does the process of this invention. Another advantage is that the crushing of insufficiently dried product, which was a characteristic of the prior art, is done away with. The invention also has the advantage of eliminating the preliminary concentration of the sludge. A particular advantage is that the regularity of the process is much improved and is automatically maintained by means of the automatic regulation of discharge to the stock and the re-cycling of the surplus.

Although the invention is particularly concerned with fertilizers and their manufacture, it is applicable to similar granulation processes in which a sludge, containing water, receives a re-cycled part of the finished product in order to facilitate the granulation, and it is particularly characterized in that the product re-cycled is divided into several fractions of different sizes which are added to the sludge at different stages in the process, the oversized particles, or granules, being added to the sludge while it is still full of water and capable of dissolving some part of the granules, the finest particles being added last and in a stage of the process where the concentration of solids in the sludge is relatively high, so that the fine particles are capable of being enlarged by accretion of part of the solids in the sludge.

In the process generalized in the preceding paragraph, the product issuing from the process is divided into a product having the desired dimensions, a product having oversized dimensions and a product having undersized dimensions, the oversized being re-cycled to the sludge at a state where it still contains enough water to dissolve a part of the product and reduce its dimensions to a size equal or less than the largest which is desired in the final product; the fines being added to the sludge at a stage later than the foregoing, and at which the sludge is capable of crystallizing upon fine particles and increasing their dimensions.

As it is frequently the case that the dissolving of a final product and initial sludge is accompanied by a reduction in temperature, the temperature is maintained at a value advantageous to the reactions proceeding in the sludge, either by introducing heat from an external source or by exothermic chemical reactions accomplished in situ, the external application of heat being, for example, by blasts of hot air directed upon the sludge, or by heating one or another of the ingredients which are to be admitted to the sludge. In one manner of executing the invention, re-cycled product is brought hot from the heated rotary drum in which drying of the product is accomplished; this is advantageous in the fertilizer industry.

At the stage of the process in which fine particles are re-cycled to the sludge, the temperature is maintained, at the time of admission of the fines, at a temperature favorable to the crystallization of the product upon fine particles. The temperature may be maintained either by cooling the fines prior to their admission to the apparatus or by a blast of cold air directed upon the sludge. These various cooling means may be combined whenever it is advantageous.

When the sludge has received the oversized particles and some of the fines which have been re-cycled, after size classification, it may also receive any solid material which is desired in the finished product and which does not react chemically with the ingredients of the sludge, to change the character thereof. In the manufacture of fertilizers, a binary sludge may be made into a ternary fertilizer by the addition of an element which is not normally present in the sludge as it comes from the acid opening of the natural phosphate. An example is the addition of potassium salt to a phospho-nitrate fertilizer. On the other hand, additional quantities of the finished product may be admitted, after diminution if desired.

Generally speaking, it is desirable to readmit the oversized particles while they are still hot from the drier. This is invariably so in the manufacture of fertilizer, to compensate for the cooling effect of the heat of dissolution. The superior control of the regularity of the process can be maintained by directing to stock somewhat less than the totality of the finished product, the excess being re-cycled with or without preliminary reduction in size. Preferably, the product thus re-cycled is divided by crushing or grinding and cooled before readmission to the process.

A particularly advantageous employment of the principles of the invention is found in the manufacture of phospho-nitrate fertilizers, regardless of whether the attack upon the phosphate of fertilizer grade is accomplished by nitric acid alone or by nitric acid in combination with other acids. The process is particularly advantageous when the said attack is followed by an ammoniation.

As many apparently widely different embodiments of the present invention may be made without departing from the spirit and scope thereof, it is to be understood that the invention is not limited to the specific embodiments.

What is claimed is:

1. A process of making fertilizer from a sludge resulting from the attack by nitric acid on natural phosphate of fertilizer grade from which calcium nitrate has been removed and to which ammoniacal nitrogen has been added and which comprises about 28% water, which comprises mixing ammonia with the sludge, simultaneously adding thereto hot, oversized granules, as hereinafter defined, taken from the fertilizer produced by the process, while maintaining the sludge at about 105 degrees C., removing a part of the product thus produced and adding thereto additional quantities of said hot, oversized granules while maintaining said part at about 90 degrees C., mixing the product with enough cold, undersized particles, as hereinafter defined, taken from the fertilizer produced by the process, to produce a paste, while maintaining the temperature under 70 degrees C., mixing the paste thus formed with disruptive agitation with potassium chloride and with finely divided fertilizer derived from the product produced by the process, drying the product, separating it into parts having dimensions on the order of 2 to 4 millimeters, dimensions over that size and dimensions under that size, and re-cycling the parts having oversized dimensions to the process steps as hereinbefore indicated.

2. A process of making fertilizer from a sludge resulting from the attack by nitric acid on natural phosphate of fertilizer grade from which calcium nitrate has been removed and to which ammoniacal nitrogen has been added and which comprises about 15% $P_2O_5$, 6.5% nitric acid, 5.5% ammoniacal nitrogen and 28% water, which comprises mixing ammonia with the sludge, simultaneously adding thereto hot, oversized granules, larger than about 4 mm., taken from the fertilizer produced by the process, while maintaining the sludge at about 105 degrees C., removing a part of the product and adding thereto additional quantities of said hot, oversized granules while maintaining said part at about 90 degrees C., mixing the product with cold, undersized particles, slightly less than about two millimeters in size, taken from the fertilizer produced by the process, while maintaining the temperature under 70 degrees C., mixing the paste thus formed, with disruptive agitation, with potassium chloride and with more, finely divided fertilizer derived from the product produced by the process, drying the product, separating it into parts having dimensions on the order of 2 to 4 mm., oversized dimensions, and undersized dimensions, and re-cycling the parts having oversized and undersized dimensions to the process steps as hereinbefore indicated.

3. The steps in the process of making fertilizer from the sludge resulting from the attack of acid on phosphate of fertilizer grade which comprises recycling to the said sludge from the final product of the process, particles of size too large to be desired in the commercial product, the addition being made to a said sludge containing water sufficient to reduce the size thereof by dissolving such too-large particles until their dimensions are reduced to those desired in the commercial product, adding to the product thus produced particles of fertilizer, derived from the final product, having dimensions less than those desired in the commercial product, granulating and drying the final product, and separating therefrom the parts of commercial size.

4. A process of making fertilizer from a sludge resulting from the attack by acid on phosphate of fertilizer grade which contains about 28% water, which comprises adding to the said sludge granules of fertilizer, produced by such process, too large to be desired in the commercial product, while maintaining the sludge at about 90 to 105 degrees C., mixing the product with particles of fertilizer, produced by the process, too small to be desired in the commercial product while maintaining the temperature under about 70 degrees C., mixing the paste thus formed with disruptive agitation with finely divided particles of such fertilizer, drying the product with heat, separating it into parts having dimensions desired in the commercial product, dimensions too large for the commercial product and dimensions too small therefor, and recycling the parts having the too-large and the too-small dimensions as aforesaid.

5. A process of making fertilizer from a sludge resulting from the attack by acid on phosphate of fertilizer grade which contains sufficient water to reduce the size of fertilizer granules produced by the process, which comprises adding to such sludge hot granules, taken from the fertilizer produced by the process, which are too large for the commercial product, while maintaining the sludge at about the boiling temperature of water, mixing the product with cold particles taken from the fertilizer produced by the product, which are too small for the commercial product, while maintaining the temperature under 70 degrees C., mixing the paste thus formed, with disruptive agitation, with finely divided fertilizer derived from the product produced by the process, drying the product, separating it into parts having dimensions desired in the commercial product, dimensions too large therefor and dimensions too small therefor, cooling the parts having the too small dimensions, and re-cycling the said too large and too small parts to the steps hereinbefore indicated, the parts having too-large dimensions being recycled while still hot.

6. A process of making fertilizer granules of commercial sizes from a sludge resulting from the attack by acid, comprising nitric acid, on phosphate of fertilizer grade, which sludge contains sufficient water to reduce the size of fertilizer granules produced by the process, which comprises mixing ammonia with the said watery sludge, simultaneously adding thereto hot fertilizer granules of size too large to be included in such commercial sizes, taken from the fertilizer produced by the process, while maintaining the sludge at about 90 to 105 degrees C., mixing the product of such addition with enough cold particles, taken from the fertilizer produced by the process, too small to be included in such commercial sizes, to form a paste, while maintaining the temperature under 70 degrees C., mixing the paste thus formed with disruptive agitation with sufficient additional finely divided fertilizer, derived from the product produced by the process, to produce granulation, drying the product, separating it into parts having dimensions desired in the commercial product, dimensions too large, and dimensions too small for such commercial product, recycling the said too-large parts, as aforesaid, while still hot from the drier, cooling the too-small parts, and recycling the said too-small parts, as aforesaid.

7. A process of making fertilizer from a sludge resulting from the attack by acid comprising nitric acid on phosphate of fertilizer grade from which calcium nitrate has been removed and which contains sufficient water to reduce the size of fertilizer granules produced by the process, which comprises mixing ammonia with the said watery sludge, simultaneously adding thereto hot granules of such fertilizer as is produced by the process, in sizes too large to be desired in the commercial product, while maintaining the sludge at about 90 to 105 degrees C., mixing the product of such addition with particles taken from the fertilizer produced by the process, in sizes too small to be desired in the commercial product, while maintaining the temperature under 70 degrees C., mixing the paste thus formed with disruptive agitation with sufficient finely divided fertilizer of the type produced by the process to produce granulation, drying the product, separating it into parts having dimensions desired in the commercial product, parts too large and parts too small therefor, and recycling the too large parts and too small parts to the process steps as hereinbefore indicated.

8. A process of making fertilizer from a sludge resulting from the attack by acid comprising nitric acid on phosphate of fertilizer grade from which calcium nitrate has been removed and which contains sufficient water to reduce the size of granules of fertilizer such as is produced by the process, which comprises mixing ammonia with the sludge, simultaneously adding thereto hot granules of fertilizer such as is produced by the process, in sizes too large to be desired in the commercial process, while maintaining the sludge at about 90 to 105 degrees C., mixing the product with cold particles of such fertilizer as is produced by the process in sizes too small to be desired in the final product, while maintaining the temperature under 70 degrees C., in quantity sufficient to form a paste, mixing the past thus formed with disruptive agitation with a fertilizer component, and with finely divided fertilizer derived from the product produced by the process, drying the product thus produced, separating it into parts having dimensions desired in the commercial product, and into dimensions too large and too small therefor, and recycling the too large and too small dimensions to the process steps as hereinbefore indicated.

9. A process of making fertilizer from a sludge resulting from the attack of nitric acid on phosphate of fertilizer grade from which calcium nitrate has been removed and which comprises about 28% water, which comprises mixing ammonia with the sludge, simultaneously adding thereto hot granules, too large for the commercial product, taken from such fertilizer as is produced by the process, while maintaining the sludge at about 105 degrees C., removing a part of the product thus formed and adding thereto additional quantities of said hot, too-large granules while maintaining said part at about 90 degrees C., mixing the product of such addition with enough cold particles, taken from the fertilizer produced by the process, in sizes too small to be included in the finished product, to form a paste, while maintaining the temperature under 70 degrees C., mixing the paste thus formed with disruptive agitation with a potassium-containing fertilizer component and with finely-divided fertilizer derived from the product produced by the process, drying the product thus produced, separating it into parts having dimensions desired in the commercial product, dimensions too large therefor and dimensions too small, and recycling the too large and too small dimensions to the process steps as hereinbefore indicated.

10. In the manufacture of fertilizer in which a sludge is formed by attacking phosphate of fertilizer grade with acid comprising nitric acid, the steps that comprise adding to the said sludge from the finished product of the process particles of size too large to be commercially desired, the addition taking place in the presence in the sludge of water sufficient to dissolve the said added oversized particles sufficiently to reduce their size to that commercially desired, adding afterwards to the sludge from the finished product of the process particles of size too small to be commercially desired, granulating the paste thus formed, separating the finished product into particles having the size commercially desired, particles too small and particles too large, and recycling the said too large and too small particles as hereinbefore indicated.

11. The steps in the process of making fertilizer from the sludge resulting from the attack by acid comprising nitric acid on phosphate of fertilizer grade and subsequent addition of ammonia, that comprise: adding to the said sludge from the finished product of the process oversized particles, i. e., particles of size too large to be commercially desired, the addition taking place in the presence in the sludge of water sufficient to dissolve the said added oversized particles sufficiently to reduce their size to that commercially desired, and while maintaining the sludge at about 90 to 105 degrees C., adding afterwards to the sludge from the finished product of the process undersized particles, i. e., particles of size too small to be commercially desired, while maintaining the temperature under 70 degrees C., mixing the paste thus formed with disruptive agitation with finely divided fertilizer derived from the finished product of the process, granulating the paste thus formed, separating the finished product into particles having commercially desired size, oversized and undersized particles, and recycling the said oversized and undersized particles as hereinbefore indicated.

12. Apparatus for the manufacture of fertilizer comprising a size reduction and ammoniation vat, a dissolving and concentrating vat connected to the said ammoniation vat to receive the discharge therefrom, means to heat the concentrator vat, a mixer vat connected with the concentrator vat to receive the discharge therefrom, means to cool the mixing vat, a granulator connected with the said mixer to receive the discharge therefrom, a drier connected with the granulator to receive the discharge therefrom, a coarse screen connected with the drier to receive the discharge therefrom, means to transfer the particles rejected by the coarse screen to the said ammoniation and concentrator vats, means to transfer the particles passed by the coarse screen to a cooler, means to transfer the material in the cooler to a fine screen, means to transfer the material passed by the fine screen to the said mixer, means to transfer the material of medium size rejected by the fine screen to a selector of uniform output, means to transfer the over-plus from the selector to a crusher, and means to transfer the material from the crusher to the said granulator.

References Cited in the file of this patent
UNITED STATES PATENTS

| | | |
|---|---|---|
| 709,185 | Terne | Sept. 16, 1902 |
| 1,999,026 | Tramm et al. | Apr. 23, 1935 |
| 2,015,384 | Nordengren | Sept. 24, 1935 |
| 2,167,432 | Cox et al. | July 25, 1939 |
| 2,448,126 | Shoeld | Aug. 31, 1948 |
| 2,598,658 | Procter et al. | May 27, 1952 |